United States Patent [19]
Wright et al.

[11] Patent Number: 5,746,789
[45] Date of Patent: May 5, 1998

[54] APPARATUS FOR SEPARATING PARTICULATES FROM A FLUID STREAM

[75] Inventors: Steve Robin Wright, Hillsborough; Harry Steven Crouch, Chapel Hill, both of N.C.

[73] Assignee: Innovatech, Inc., Durham, N.C.

[21] Appl. No.: 563,630

[22] Filed: Nov. 28, 1995

[51] Int. Cl.$^6$ .................................................. B01D 45/14
[52] U.S. Cl. .................. 55/306; 55/406; 55/409; 95/35; 95/270; 210/512.3; 210/787
[58] Field of Search .................. 55/306, 400, 406–409; 95/270, 34, 261, 269, 35; 96/196, 214; 210/512.3, 787; 244/53 B; 60/39.092

[56] References Cited

U.S. PATENT DOCUMENTS

| | | | |
|---|---|---|---|
| 2,425,410 | 8/1947 | Zeitlin et al. | 55/409 |
| 2,431,336 | 11/1947 | Lincoln | 55/409 X |
| 2,603,309 | 7/1952 | Mercier et al. | 55/289 |
| 2,991,844 | 7/1961 | Nomar | 55/403 |
| 3,174,264 | 3/1965 | McKnab | 55/317 |
| 3,234,716 | 2/1966 | Sevin et al. | 55/408 |
| 3,436,910 | 4/1969 | Haworth | 60/39.092 |
| 3,537,240 | 11/1970 | Weidinger et al. | 55/306 |
| 3,616,616 | 11/1971 | Flatt | 55/306 |
| 3,648,857 | 3/1972 | Grasvoll | 414/792.4 |
| 3,673,771 | 7/1972 | Dickey | 55/306 |
| 3,766,719 | 10/1973 | McAnally, III | 55/306 |
| 3,832,086 | 8/1974 | Hull, Jr. et al. | 55/306 X |
| 3,871,844 | 3/1975 | Calvin, Sr. | 55/306 |
| 3,979,903 | 9/1976 | Hull, Jr. et al. | 55/306 X |
| 3,998,048 | 12/1976 | Derue | 55/306 X |
| 4,123,241 | 10/1978 | Maden | 55/442 |
| 4,149,689 | 4/1979 | McDonald | 55/306 X |
| 4,158,449 | 6/1979 | Sun et al. | 244/136 |
| 4,198,218 | 4/1980 | Erickson | 55/408 |
| 4,225,324 | 9/1980 | Gazda | 55/407 X |
| 4,268,281 | 5/1981 | Erickson | 55/408 X |
| 4,389,227 | 6/1983 | Hobbs | 55/306 |
| 4,493,185 | 1/1985 | Hobbs | 60/39.092 |
| 4,509,962 | 4/1985 | Breitman et al. | 55/306 |
| 4,561,867 | 12/1985 | Charbonnel | 55/409 X |
| 4,592,765 | 6/1986 | Breitman et al. | 55/306 |
| 4,923,491 | 5/1990 | Lawless et al. | 55/409 |
| 5,139,545 | 8/1992 | Mann | 55/306 |
| 5,229,014 | 7/1993 | Collins | 210/512.3 X |
| 5,244,479 | 9/1993 | Dean, II et al. | 96/174 |

OTHER PUBLICATIONS

Bickert et al, "A New Centrifugal Classifier for the Separation of Concentrated Suspensions Under 10 μm", *Advances in Filtration and Separation Technology*, vol. 9, pp. 531–534, Apr. 23–26, 1995.

*Primary Examiner*—Richard L. Chiesa
*Attorney, Agent, or Firm*—Richard E. Jenkins, P.A.

[57] ABSTRACT

A radial inflow centrifugal filter device for separating fine particulates from a fluid flow, including a rotatable plurality of hollow parallel disks mounted in spaced apart relationship and attached via spacers to a tube. The hollow drive tube is in flow communication with the interior hollow plenum of the disks which is at a lower pressure relative to the open space between the disks. Rotating the tube causes the disks to rotate. Particulate-laden fluid is allowed to enter the filter device at the perimeter of the rotating disks and experiences a change in momentum due to the interaction of boundary layers of fluid established on each side of every disk. The centrifugal force imparted to both the fluid and particulates causes them to be separated in opposite directions. The particulates are quickly expelled away from the perimeter entrance of the device into the protective cowling surrounding the device, eventually to be scavenged away The filtered fluid continues its motion through the rotating disks, into the central plenum and through the hollow drive tube, thus effecting separation.

17 Claims, 4 Drawing Sheets

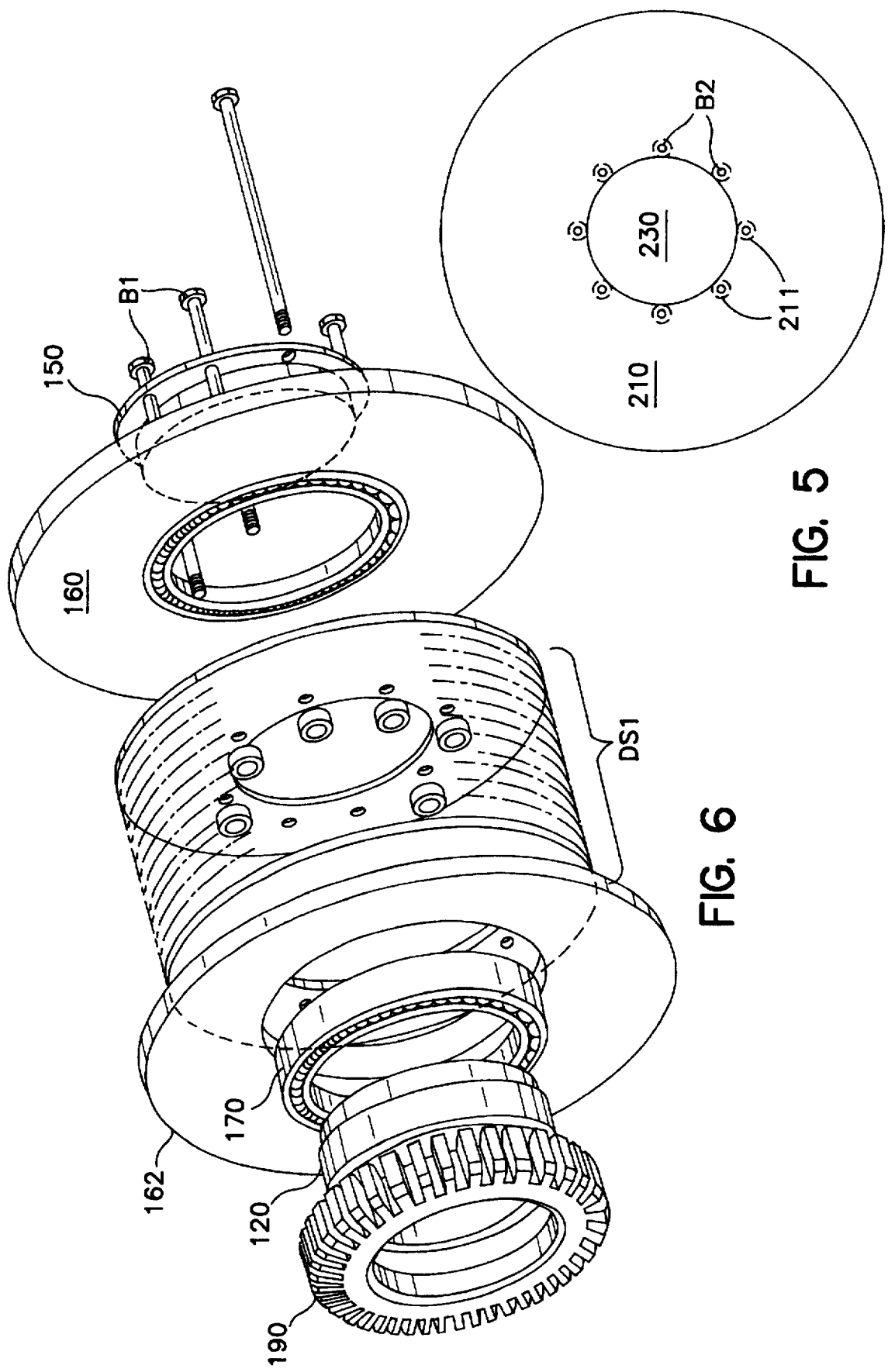

APPARATUS FOR SEPARATING PARTICULATES FROM A FLUID STREAM

TECHNICAL FIELD

The present invention relates, in general, to an apparatus and a method for the centrifugal separation of a particle laden fluid into a particle-free stream and a particle rich stream. More particularly, this invention relates to an apparatus and a method for the removal of particles from a particle laden fluid stream via centrifugal separation imparted by boundary layers of fluid between rotating parallel disks, whereby the primary fluid flow runs counter to the ejected trajectory of the particles.

BACKGROUND ART

Particulate (i.e., sand, fly ash, etc.) ingestion causes severe performance degradation, excessive wear and increased maintenance in turbine engines or generators. Current inlet particle separators are capable of removing large sand particles, but experience a dramatic decrease in removal efficiency as particle sizes decrease. For example, fine sand particles (i.e., those having a diameter less than 8 microns) prevalent in desert environments are especially problematic to helicopter turbine engines during close ground hovering operations. In addition to efficiency problems, current inlet particle separator designs have proved to be too expensive and difficult to be used to retrofit existing turbine engines already in the field. These separator designs (i.e., vortex-tube, passive barrier systems, electrostatic precipitators, etc.) have not been able to achieve desired levels of protection without sacrificing required engine performance.

More specifically, protection of turbine engines from particle-entrained air falls into two broad categories: barrier-type filters and inertial separators.

Traditional barrier protection screens which filter inlet air to aircraft turbine engines are disclosed by Weidinger et al. in U.S. Pat. No. 3,537,240; Calvin in U.S. Pat. No. 3,871,844; and McDonald in U.S. Pat. No. 4,149,689. While barrier-type filtering screens offer a high degree of protection, their use is limited due to the necessity for periodic filter cleaning or replacement. Moreover, these inlet filters typically exhibit a performance degradation as particle loading occurs during normal operation, resulting in an increasing pressure drop across the filter which adversely affects turbine engine performance. Furthermore, engine vibration can cause entrapped particles to migrate through the filter and into the turbine engine.

Many investigators have proposed methods for achieving the separation of particulates from a gas stream by the use of centripetal acceleration (i.e., centrifugal force acts on the particulates to propel them away from the primary flow stream) in what are termed inertial particle separators. These inertial particle separators are self-cleaning filters, which offer enhanced sustainable protection to turbine engines. The concept centers on the primary inlet flow of particle laden air being deflected by an obstacle or a sharp turn in the flow stream and then split into two streams of differing velocity. Because of the much greater inertia of solid particulates than that of air molecules, the particulates tend to concentrate in the faster moving gas stream while the slower moving stream of somewhat cleaner air enters the turbine engine.

Flatt in U.S. Pat. No. 3,616,616; McAnally in U.S. Pat. No. 3,766,719; Breitman et al. in U.S. Pat. Nos. 4,592,765 and 4,509,962; and Mann in U.S. Pat. No. 5,139,545 describe inertial particle separators based on fixed deflector pathways. Variations of the fixed inlet particle separator concept are air intakes with mushroom shaped deflectors, such as those described by Morley et al. in U.S. Pat. No. 3,684,857 and Hobbs in U.S. Pat. Nos. 4,389,227 and 4,493,185. Inertial particle separators with multiple deflectors or separator vanes have been described by Dickey in U.S. Pat. No. 3,673,771; Derue in U.S. Pat. No. 3,998,048; Haworth in U.S. Pat. No. 3,436,910; and Maden in U.S. Pat. No. 4,123,241.

Vortex air cleaners utilize the same concept of inertial particle separation except that the inlet gas stream is pulled through a cylindrical pathway containing obstacles (vanes/scrolls) such that the particulates have both tangential and axial velocity components. Utilization of tangentially arranged gas stream deflectors to impart centrifugal force to entrained particulates is described by Hull et al. in U.S. Pat. Nos. 3,832,086 and 3,979,903 and Sun et al. in U.S. Pat. No. 4,158,449.

The apparatus of Mercier et al. described in U.S. Pat. No. 2,603,309 uses a plurality of parallel plates arranged in close proximity (1 cm or less), in which a 180° change of flow direction of dust particles effects their removal from the flow stream due to the higher momentum of the particles, conveying them towards the outside of the bend whereby they are removed. In the principle of operation of the device of Mercier et al., momentum transfer is not effected by boundary layers present in a rotating plurality of disks. One embodiment of the Mercier et al. apparatus utilizes a rotational set of parallel plates arranged axially, with flow entering and exiting axially; however, the separation principle is still the same as in the above-described barrier-type filters and inertial separators.

Thus, although minor improvements in inertial particle separators have been made over the years to enhance the separation efficiency of finer particulates attempting to enter the turbine engine inlet, the basic filtration concept remains unchanged, namely the particulates are separated from the primary flow path in essentially the same direction as the gas. A tight turn in the inlet flow path is used to exclude heavier, larger particulates, but lighter, smaller particulates can make the turn and are therefore allowed to enter the turbine engine inlet. Intrinsic to air/particle separation based on the traditional inertial concepts are problems of high pressure drop across the filtration device, incomplete removal of particulates and the necessity quickly to eliminate scavenged particulates from the entrance of the turbine engine. For example, conventional filtration systems require separated particulates to be quickly drawn away from the turbine inlet by either the forward motion of the aircraft (ram effect, which is not necessarily valid for helicopters) or via an auxiliary scavenger blower.

On the other hand, the operating principle of the apparatus of Lawless et al. described in U.S. Pat. No. 4,923,491 is that aerosol particles are separated from a gas stream via a pair of rotating annular disks attached to a perforated concentric central hub. The Lawless et al. device is designed specifically for aerosol particle concentration, extraction, and collection from a particle laden gas stream. The primary goal of the Lawless et al. device is to maintain the aerosol particles in suspension within a closed housing so as to concentrate the particle stream for collection of valuable particles without attendant agglomeration typical with prior art devices.

More particularly, disclosed by Lawless et al. is a centrifugal filter for separating aerosol particles from a gas stream. The filter includes a rotatable hollow hub and at least one pair of annular disks fixedly mounted in spaced apart relationship on the hub with a stationary housing mounted on the hub. The hub is perforated in the region between the 2 disks and is coupled to a vacuum pump. As a result, the interior of the hub is at a lower pressure relative to the space between the disks. As the hub is rotated, it causes rotation of the disks, and aerosol particles in a flow gas are introduced between the disks and the housing at the periphery of the disks. The pressure differential produced at the hub perforations draws the aerosol laden gas toward the hub, and as the gas enters between the rotating disks and the housing, it experiences an acceleration approximately equal to the angular velocity of the disks. The result is a centrifugal force being applied to the aerosol particles in a direction opposite to the drag force exerted by the vacuum pump. The particles in the gas stream remain entrained in the outer periphery where they are removed, while the gas continues its motion toward the hub, and separation is accordingly effected.

Hence, the filter disclosed by Lawless et al. avoids the build up of deposits within the filter by maintaining the aerosol particles in suspension so as to produce a concentrated stream of aerosol particles that is easily removable from the filter without impacting on a surface within the filter. Consequently, the Lawless et al. device would not be amenable to turbine filtration due to the unacceptably high pressure drop across the device due to flow obstructions (i.e., the use of a central hub with perforated holes to allow gas transfer through a pair of rotating disks) as well as an unacceptably low mass flow rate, typically orders of magnitude less than that required by even very small turbine engines. The use of a housing having tight tolerances with the rotating disks, an attached centrifugal pump (further complicating the device and adversely affecting its fabrication and maintenance cost, as well as its overall weight), inlet and exit ports on the housing, inlet and exit valves, and a gas outlet through the downstream housing are further drawbacks of this device.

Lastly, U.S. Pat. No. 4,198,218 (parent) issued Apr. 15, 1980 to Erickson and U.S. Pat. No. 4,268,281 (divisional) issued May 19, 1981 to Erickson show, respectively, an apparatus and a method employing that apparatus for removing particulate contaminants from a stream of transient gas. Desirably, water is provided in order to add moisture and wet the particulates in the gas stream, as according to Erickson, dust particles can be most efficiently removed by initially moistening them and thereafter introducing the air with the moistened dust particles suspended therein into the apparatus.

The apparatus of Erickson includes a generally cylindrical housing rotatable about a central axis and defining a main separating chamber. Additionally, the apparatus includes a dirty gas inlet communicating with the interior of the housing and means for increasing the radial velocity of the dirty gas that is introduced into the housing through the gas inlet. Stationary fluid intake passage means extends radially outwardly of the central axis of the housing into the main separating chamber, and the passage means includes a fluid intake opening at the outer most end thereof and a fluid outlet in communication with the opposite end thereof. Stationary particulate intake passage means extends radially outwardly of the central axis of the housing into the main separating chamber, and includes a particulate intake opening at the outer most end thereof and a particulate outlet in communication with the opposite end thereof. An impingement plate separator is disposed between the interior of the housing and the clean gas outlet for mechanically removing particulates from the gas being treated, and preferably the impingement plate separator consists of an array of annular, spaced apart plates. The plates in the impingement plate separator are of 2 different sizes. More specifically, all plates have the same outside diameter, but plates alternate with one plate having a larger aperture and therefore a smaller internal diameter and then the next adjacent plate having a smaller aperture and therefore a larger internal diameter.

Hence, new technology is required to meet the existing and future operating characteristics of devices for filtration of particles, particularly those devices used in conjunction with turbine engines and generators. Desired performance criteria include: higher particulate removal efficiencies, a total pressure drop no greater than 3%, and the potential for adaptation (retrofit) to existing turbines as well as integration into future turbines. In accordance therewith, it has been unexpectedly discovered by the present inventors that the use of a boundary-layer momentum transfer (BLMT) concept will greatly improve the efficiency of fine particulate removal while reducing filter device manufacturing complexity and costs.

SUMMARY AND OBJECTS OF THE INVENTION

Thus, the present invention provides a radial inflow centrifugal filter device for separating particulates from a flow of fluid. The filter device includes a rotatable plurality of disks having an inlet end and an exit end. Each disk has a hollow center and a perimeter, the centers defining an interior hollow plenum. The disks are mounted to spacers in spaced apart parallel relationship defining spaces between the disks and wherein the hollow plenum communicates with the spaces between the disks. An end cap is attached at the disk inlet end, and a hollow rotatable tube is attached to the last disk at the exit end and in communication with the hollow plenum of the disks allowing clean filtered fluid passage. As a result, a lower pressure exists in the hollow plenum than in the spaces between the disks due to the communication through the hollow tube to the hollow plenum of the disks. Therefore, rotating the hollow tube and the disks while a flow of particulate laden fluid is introduced to the inlet end of the disks from outside the disks produces sufficient boundary layers of fluid on each side of each disk, and the boundary layers of fluid impart angular momentum to particulates entrapped in the fluid flow thereby preventing their entering the spaces between the disks. Hence, clean filtered fluid passes through the plenum and out the exit end and the particulates are ejected and pass outside the perimeters of the disks.

Accordingly, the object of the present invention is to provide a novel radial-flow centrifugal filter device for separating particulates from a fluid stream, the filter device having better separation discrimination of very fine particles, i.e., those having a diameter of 6 microns or even smaller, over current state-of-the-art inlet particle separator designs.

A further object of the present invention is to provide a novel radial-flow centrifugal filter device that uses the boundary layers of fluid generated on the sides of each of a plurality of spaced apart parallel rotating annular disks to transfer momentum to particulates in an incoming flow of fluid, resulting in their expulsion from the filter device, rather than into the apertures of the annular disks followed by leaving the device by passing out through the spaces between disks.

Still another object of the present invention is to provide a novel radial-flow centrifugal filter device that has no physical impediments or obstructions to fluid flow through the filter device, resulting in a desirable low pressure drop across the filter device and thereby enhancing turbine engine performance.

It is an advantage of the present invention, that unlike prior art filters, the technology can be applied to many military and commercial turbine applications (helicopters, tanks, hovercraft, etc.) that are susceptible to ingested matter from close ground hovering operations in sandy areas.

Some of the objects and advantages of the invention being stated, other objects will become evident as the description proceeds, when taken in connection with the accompanying Figures described below.

BRIEF DESCRIPTION OF THE DRAWINGS

FIG. 5 is an end view taken at the plane defined by line Z—Z of FIG. 2;

FIG. 6 is an exploded perspective view of the radial inflow centrifugal filter device of the present invention of FIG. 1 with a housing.

DETAILED DESCRIPTION OF THE INVENTION

Figure 1:
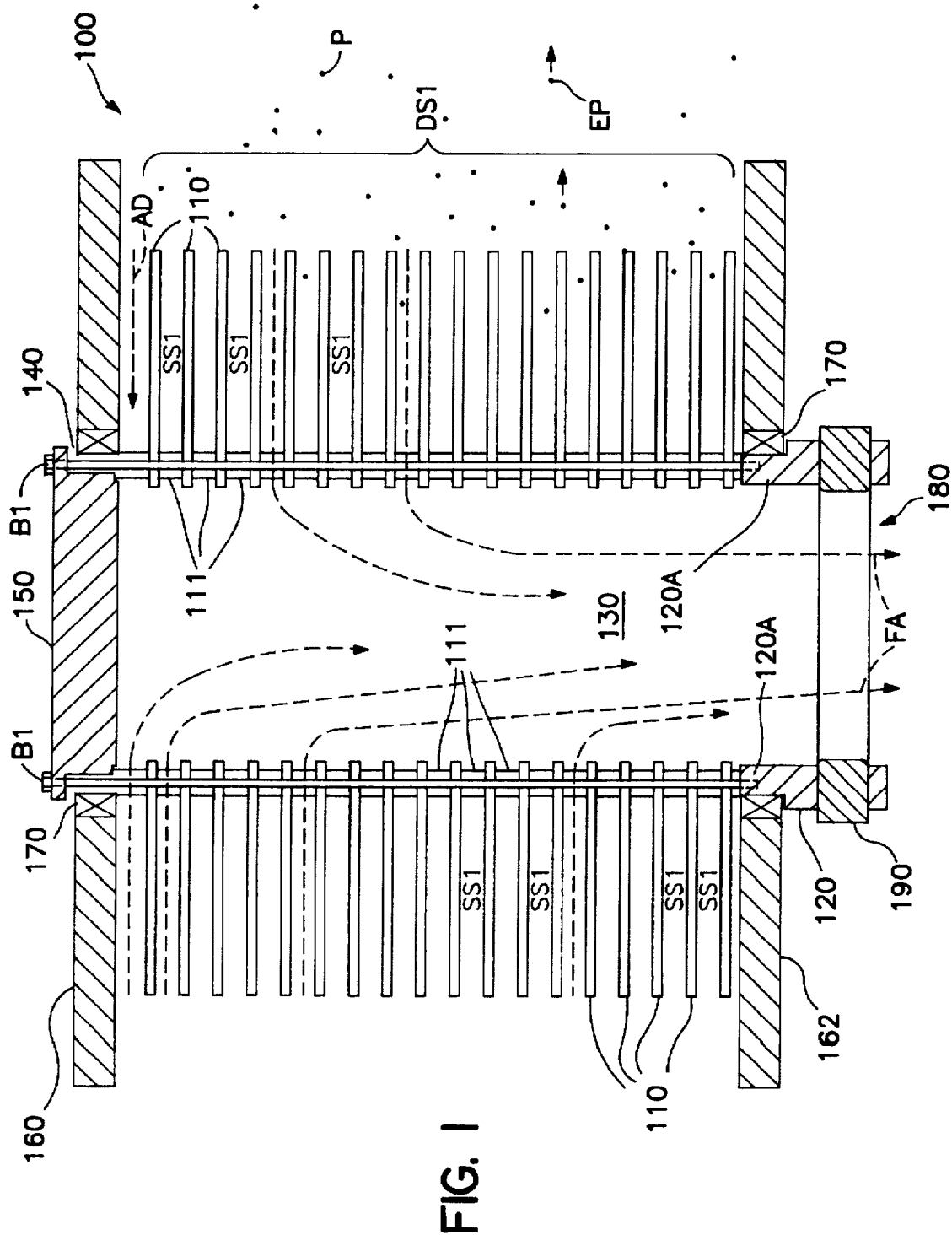
FIG. 1 is a cross-sectional side view of the radial inflow centrifugal filter device of the present invention showing key elements thereof.

Referring now to FIG. 1, the following is a description of inventive radial inflow centrifugal filter device 100 wherein particulate or particle P laden air is directed along axial direction AD for a primary inlet flow. Filter device 100 includes a plurality of disks 110 mounted parallel to each other, and separated with spaces SS1 from each other by spacers 111, whereby disks 110 define disk set DS1. Disks 110 are shown in a preferred embodiment as flat annular disks, but can be of other configurations such as non-planar disks. Disks 110 and spacers 111 may be fixedly secured to each other, or alternatively, spacers 111 may be adjustable for movement of disks 110 so that the distance of spaces SS1 between disks 110 may be made larger or smaller.

Disks 110 are held together via a plurality of long bolts B1 that run through disks 110 and spacers 111. Bolts B1 are affixed (preferably screwed for ease of maintenance) to hollow drive tube 120 at end 120A thereof. As disks 110 are annular, they have respective apertures 110A defining plenum cavity 130 in the center of disk set DS1.

Entrance or inlet end 140 (upstream) of filter device 100 is capped with end cap 150 which is attached to first and second support members 160, 162 via bearings 170. Exit or outlet end 180 (downstream) of filter device 100 is open, so as to be in direct flow communication with an inlet of a turbine engine (not shown), when attached to the engine inlet via rotating gas seals (not shown).

Figure 2:
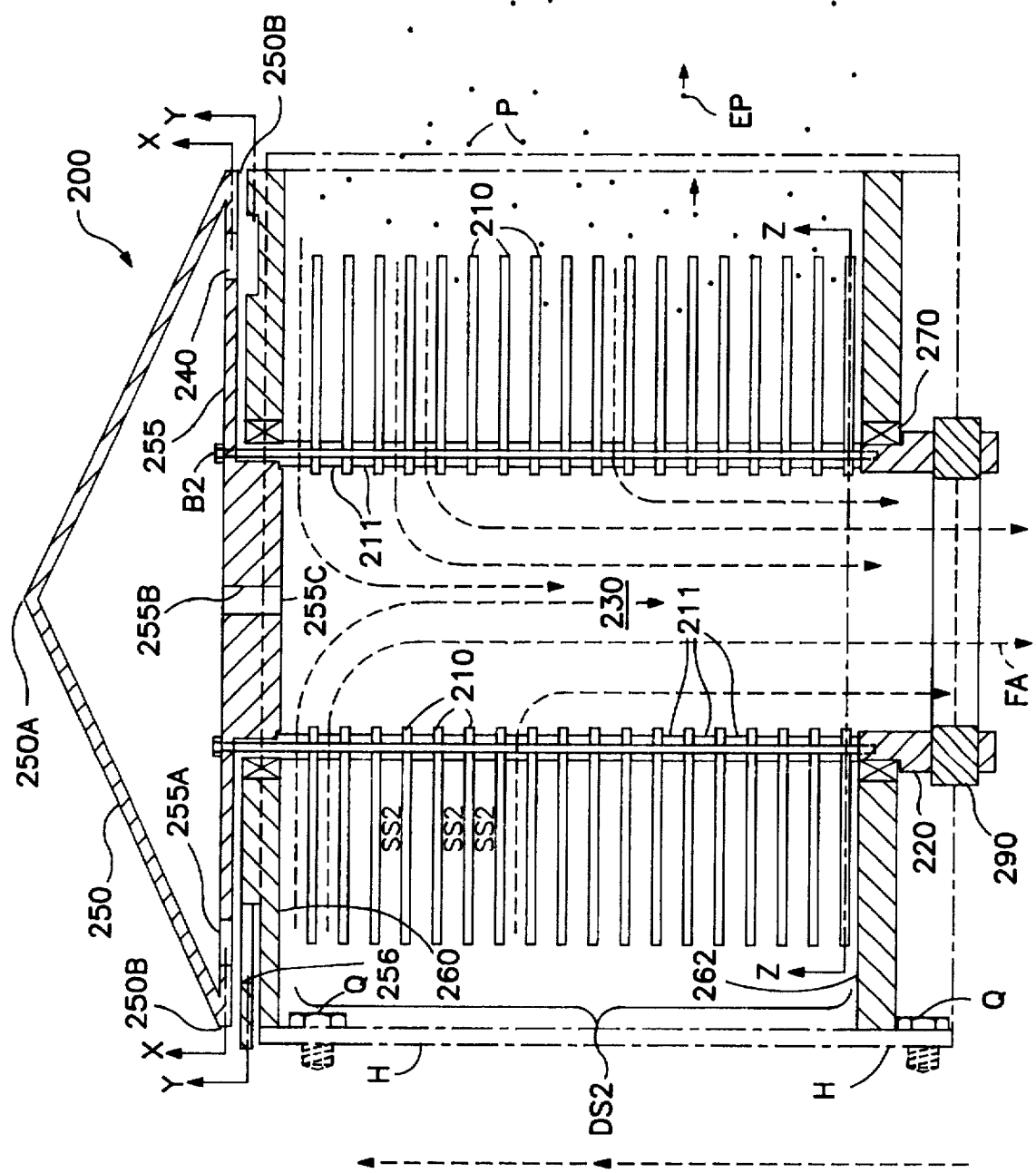
FIG. 2 is a cross-sectional side view of a preferred embodiment of the radial inflow centrifugal filter device of the present invention having a conical deflector end cap on the inlet air end of the device.
Figure 3:
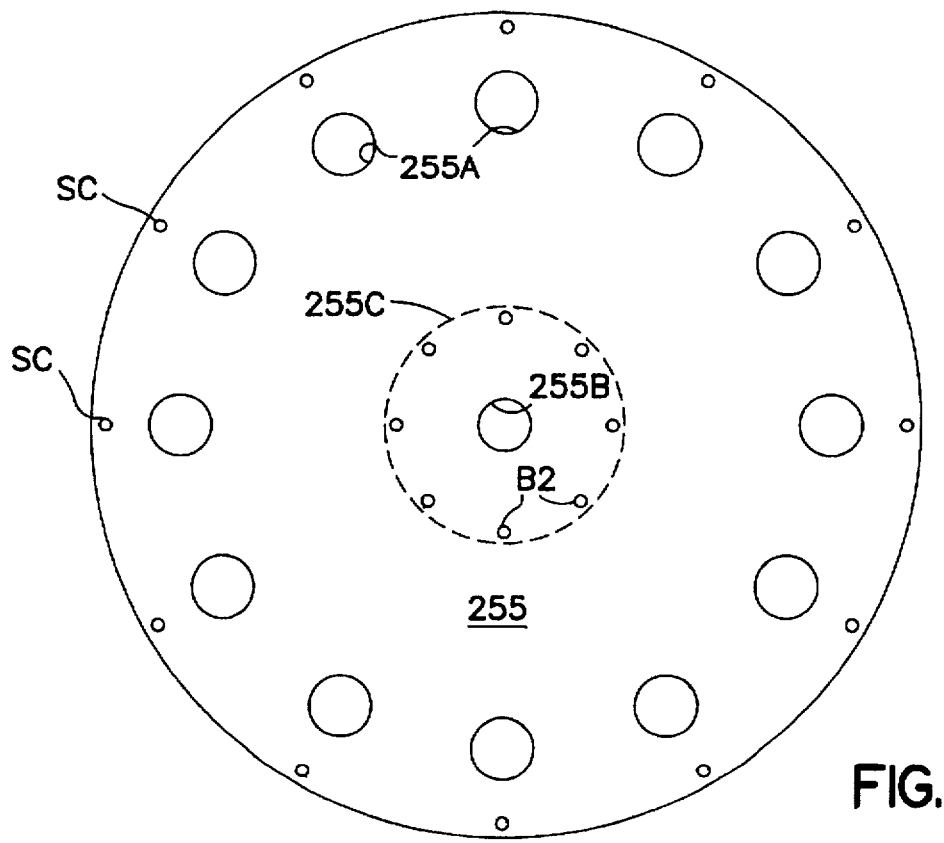
FIG. 3 is an end view taken at the plane defined by line X—X of FIG. 2.
Figure 4:
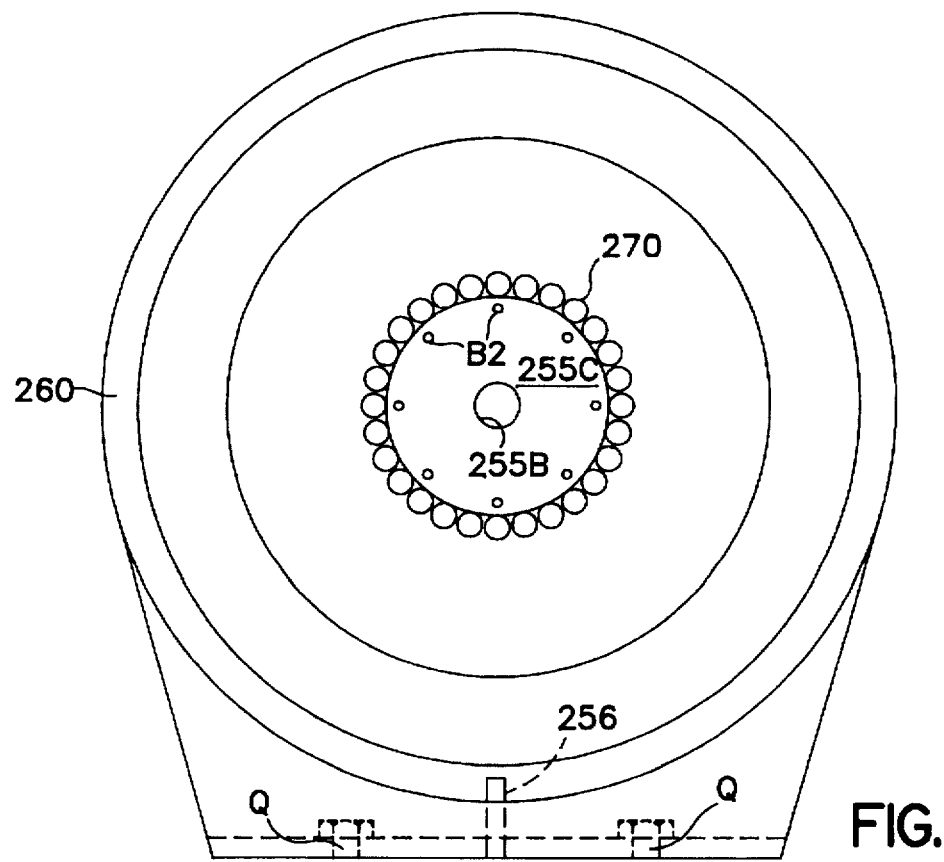
FIG. 4 is an end view taken at the plane defined by line Y—Y of FIG. 2.

Also, along axial direction AD, disks 110 are preferentially connected via first and second support members 160, 162 to a protective open duct cowling or housing (i.e., see housing H in FIG. 2) in direct communication with the primary inlet air flow and having an exit air flow downstream of the turbine engine inlet. Although protective housing H is not essential to the operation of filter device 100, for instance during forward flight of an aircraft, the open duct will create an airflow through the cavity created by the cowling or housing surrounding filter device 100, allowing for scavenging of particulates P that build up around the perimeter entrance of filter 100 without the use of an auxiliary blower. (As described below in more detail with respect to FIGS. 2, 3, 4, and 5, the same kind of protective housing H shown in FIG. 2 may also be employed with the alternative embodiment of filter device 200 by connecting first and second support members 260, 262 via bolts Q to housing H.)

The operation of radial inflow centrifugal filter device 100 is as follows.

Rotably positioned through second support member 162 at outlet end 180, hollow drive tube 120 passes (without any obstructions) filtered air FA from central hollow plenum 130 of disk set DS1 through to the turbine engine (not shown). Hollow drive tube 120, which is supported by means of bearings 170 and is held in place by support member 162 also acts as the means by which rotational energy is imparted to filter device 100 via any of a variety of drive mechanisms, for instance impeller or drive gear 190 driven by excess compressed bleed air supplied from the compressor section (not shown) of the turbine engine, a separate electrical motor (not shown), a separate auxiliary power take off shaft (not shown) coming from the turbine engine, etc.

For example, when an impeller is utilized instead of drive gear 190 attached to the outer perimeter of drive tube 120 and is caused to rotate by the impaction of high pressure excess bleed air supplied from the turbine compressor (not shown), rotary motion is imparted to attached disk set DS1 of filter device 100. The suction of the turbine engine (not shown) causes a pressure drop in central plenum 130 of spinning disks 110. The reduced pressure differential between hollow interior plenum 130 of filter device 100 and the perimeter of entrance 140 (at atmospheric pressure) causes air to flow in spaces SS1 between each pair of disks 110 in the parallel set DS1 of spinning disks 110.

During typical operation of filter device 100, particle P laden air is directed to the perimeter of rotating disks 110 of filter device 100 via protective open duct housing H. The rotational motion of disks 110 causes the development of boundary layers of air in spaces SS1 on the sides of each disk 110. These boundary layers of air impart momentum to particle P laden air attempting to enter at the perimeter of rotating disks 110 of filter device 100.

The resulting centrifugal force acting on particles P is in a direction opposite the drag force on particles P. Particles P having a size above the designed cutoff size have sufficient momentum to overcome the drag force and are ejected back as ejected particles EP (into housing H if housing H is present, or, as described further below, they stay suspended around filter device 100), while filtered air FA enters between spinning disks 110 into hollow central plenum 130 and is then drawn through hollow drive tube 120, out exit end 180, and into the turbine engine inlet (not shown).

As further described below, changing the selected size of particulates to be ejected can be readily accomplished. Filter device 100 can eject particles EP with a size of about 8 microns (so that particles of about 8 microns or greater will be ejected), more preferably about 6 microns (so that particles of about 6 microns or greater will be ejected). With proper choice of parameters (selecting parameters for disks 110 and spaces SS1 therebetween for ejection of very fine particles EP is further described below), filter device 100 can even eject sub-micron sized particles EP, i.e., particles EP of about 0.1 microns or greater, more preferably particles of about 0.01 microns or greater.

If an aircraft is in motion, the induced air current (which passes through housing H if housing H is present) scavenges ejected particles EP past the turbine engine inlet (i.e., tube 120 shown in FIG. 6) to be deposited outside of the turbine engine housing (not shown). If the aircraft is stationary (for instance, for hovering helicopters or Harrier jets), ejected particulates EP will be suspended around the perimeter of disks 110 of filter device 100 (forming a small dust cloud), which is swept away once the aircraft moves. It is not necessary to have a scavenger blower to sweep suspended particles EP away; ejected particles EP cannot enter filter device 100, even after numerous attempts while the aircraft is stationary. In contrast, conventional inlet particle separators must have a scavenger blower, since the primary filtration principle utilized for the past several decades allows rejected particles to reenter the inlet if they are not immediately scavenged away from the turbine engine inlet.

The rotational requirement for inlet particle filter device 100 can be supplied by several different means, i.e., a small external motor M (not shown) or possibly direct power from the main engine power shaft (not shown). A desirable engineering design, however, utilizes excess compressed air from one of the outer compressor stages of the main turbine engine (not shown) to power small turbine impeller 190 attached to rotating disk set DS1 of particle separator filter device 100 to supply its rotational needs. Rotational power requirements are minimal due to relatively low boundary layer drag losses, since rotating (non-aerodynamic) flat disks 110 can easily sustain constant velocity with little power drain once accelerated to operational speed.

A preferred embodiment of the present invention is alternative filter device 200, as seen in FIGS. 2, 3, 4, and 5. Filter device 200 has a plurality of parallel disks 210 separated with spaces SS2 from each other by spacers 211 and defining disk set DS2. Like the device of FIG. 1, filter device 200 comprises a hollow drive tube 220 which is supported by means of bearings 270 and is held in place by support member 262. Tube 220 is also the means by which rotational energy is imparted to filter device 200 via any conventional drive mechanism such as an impeller or a drive gear 290, as shown. Filter device 200 utilizes a rotatable hollow end cap 250 on air inlet end 240 of filter device 200 as a protective deflector in the shape of a cone with its apex 250A pointed upstream. With use of end cap 250 in the shape of a hollow cone attached to baseplate 255 via bolts or screws SC (See FIGS. 3 and 5) around the perimeter of baseplate 255, with the sides 250B of end cap 250 extending slightly beyond the perimeter of filtration disk set DS2, then water, snow, ice or other large objects (vegetation, birds, etc.) drawn into protective cowling or housing H will be thrown away from primary flow entrance 240 to filter device 200. Consequently, lower maintenance of filter device 200 is achieved, resulting in enhanced performance and increased device survivability under adverse environmental conditions.

Excess bleed air EBA from the turbine engine compressor (not shown) can also be fed into the inside of hollow deflector cap 250 via a hot air channel 256 (see FIG. 4) cut into upstream first support member 260 to allow for anti-icing capabilities in filter device 200. Hot excess bleed air EBA from the turbine compressor enters hollow deflector cap 250 from hot air channel 256 in first support member 260 via hot air entrance holes 255A located in deflector cap baseplate 255. Hot air inside of hollow deflector cap 250 leaves via hot air exit hole 255B in the center of the baseplate 255, and is drawn into central plenum 230 due to the suction of the turbine engine (now shown) downstream.

The heated air in plenum 230 warms the rotating disks 210, allowing for de-icing capabilities across filter device 200 when disks 210 are made of a material, such as a metal alloy, that readily conducts heat.

A discussion of boundary-layer momentum transfer is set forth below for a better understanding of the present invention.

A mathematical concept known as boundary-layer momentum transfer (BLMT) can be very effectively employed in choosing parameters for designing the inventive filter device in order to remove a wide range of particulates from fluid streams in unrestricted environments. BLMT can achieve the desired performance criteria, for instance for state-of-the-art turbine engines in a cost effective manner when applied to the particular requirements of typical hostile environments (i.e., sand particles) found during standard operations (i.e., a helicopter or Harrier jet hovering over a sandy desert area).

The inventive particle separator filter device can be visualized as a set or stack of evenly-spaced annular disks, each having a large hole with the holes aligned. For ease of visualization, this can be thought of as analogous to a set or stack of 45 RPM phonograph records that are not touching each other, but rather have spacers between them attached to a hollow turntable. One end of the hollow core (upstream) is capped.

If this hollow-core set or stack of disks is rotated at several hundred to several thousand RPM (rotations per minute) and the air pressure is reduced at the core (for instance due to the turbine engine inlet downstream), outside air will be drawn through the rotating disks. The rotation of the disks establishes a boundary layer of air on each side of every disk in the set. A pressure drop across the disk set (from outer edge to inner edge) is caused by the frictional losses of outside air traversing through or near the boundary layers.

Depending on parameters, such as disk size, spacing between disks, rotational speed, disk surface roughness, downstream pressure, ambient air conditions, etc., either laminar or (more likely) turbulent boundary layers of air will be established on each side of each of the rotating disks in the set. These parameters will establish the pressure drop across the rotating filter device and should be chosen so that the boundary air layers between any 2 disks overlap or at least touch.

Particle-laden outside air enters the disk set from the perimeter and exits the filter device through one open end of the center of the disk set. Angular momentum transfer from the rotating disks via the intra-disk boundary layers of air in the filter device causes any particles that are entrained in the incoming air to be immediately expelled away from the filter device perimeter.

Particles that attempt to enter the airflow envelope of the inlet particle separator filter device will be ejected due to the momentum gained by the particles by centripetal acceleration imparted from the rotating disks by means of the boundary layers of air on the sides of the rotating disks. Air molecules, which have a mass that is orders of magnitude less than that of sand particles or other airborne particles can flow against the "stationary" boundary layers of air established by the rotating disks. There is an associated drop in pressure due to this aerodynamic drag. Particles, however, are enveloped in one of the multiple series of parallel boundary layers in the rotating disk set and sustain enough momentum to be ejected from the outer perimeter of the filter device.

An additional attribute of the inventive filter device, besides its inherent self-cleaning capability, is that the system parameters are easily variable and can be chosen so that any size range of particles can be ejected by the filter device from the inlet air stream. Either the intra-disk spacing or the rotational speed can be varied to tailor the thickness of the disk boundary layers of air and therefore vary particle momentum as described in connection with the following rejection criteria.

For particulates to be rejected from the filter device, the momentum gained by the particles when entering the flow field of the filter device must be sufficient to overcome the particle drag caused by the fluid inflow, i.e., liquid or gas inflow into the filter device. In other words, centrifugal force must be greater than the drag force. From elementary physics, the force on a particle (F) is a product of its mass and acceleration as follows:

$$F = ma \qquad (EQN\ 1)$$

where
m=mass of the particle
a=acceleration of the particle

For a rotational flow field, the centripetal acceleration ($a_c$) of the particle is the product of the square of its angular velocity and its radial position as follows:

$$a_c = \omega^2 r \qquad (EQN\ 2)$$

where
ω=angular velocity of the particle
r=radial position of the particle

Therefore, the centrifugal force ($F_c$) acting on the particle can be determined by substituting EQN 2 into EQN 1 as follows:

$$F_c = m\omega^2 r \qquad (EQN\ 3)$$

If the development of the boundary layers within the disk spaces occurs rapidly (by judicious design considerations) and the gas within the parallel disks is spun up quickly, then the angular velocity of the particles will be approximately the angular velocity of the rotating disks. Therefore, at the perimeter of the disks (i.e., at the entrance to the spaces between the disks), the centrifugal force acting on the particle can be expressed as follows:

$$F_c = m\omega^2 R_o \qquad (EQN\ 4)$$

where
$R_o$=outer radius of the disk

Since the mass of the particle is the product of the density of the particle and its volume, the mass can be determined as follows:

$$m = \rho_p V \qquad (EQN\ 5)$$

where
$\rho_p$=density of the particle
V=volume of the particle

As a first approximation, if the particles are assumed to be spherical, then the volume of a particle can be expressed as the volume of a sphere ($V_s$) as follows:

$$V_s = 4/3 \pi R_p^3 \qquad (EQN\ 6)$$

where
$R_p$=radius of the particle

Substituting EQN 6 into EQN 5 yields:

$$m = \rho_p(4/3\pi R_p^3) \qquad (EQN\ 7)$$

Substituting EQN 7 into EQN 4 yields:

$$F_c = \rho_p(4/3\pi R_p^3)\omega^2 R_o \qquad (EQN\ 8)$$

EQN 8 describes the centrifugal force acting on the particle as it enters the perimeter flow field of the filter intake. As can be seen in this equation, the centrifugal force acting on the particle is:

(a) directly proportional to the outside radius of the rotating disks, (b) proportional to the square of the angular velocity of the rotating disks, and (c) proportional to the cube of the particle radius.

The centrifugal force acting on the particles will be counterbalanced by the drag force ($F_D$) acting on the particles in the opposite direction, caused, for instance, by the suction of the turbine engine downstream of the radial inflow centrifugal filter device. If the drag force dominates the particles (for very small diameters), then these particles could enter the filter device. On the other hand, if the drag force is balanced against the centrifugal force on the particle (the particle diameter cutoff point), then the particles collect at the perimeter of the filter device and are kept in suspension, neither being sucked in or expelled away from the inlet entrance of the filter device. Those particles above the cutoff diameter will be dominated by the centrifugal force and will be expelled away from the filter device entrance.

The drag force ($F_D$) on a spherical particle can be approximated by Stoke's Law (see EQN 10), which is valid for flows with very low Reynolds' numbers ($R_D$) as follows:

$$R_D = \rho_g D_p v_g / \mu_g = \rho_g R_p v_g / 2\mu_g \qquad (EQN\ 9)$$

where
$\rho_g$=density of the gas, i.e., air
$D_p$=diameter of the particle=$R_p/2$
$v_g$=velocity of the gas, i.e., air
$\mu_g$=dynamic viscosity of the gas $$F_D = 6\pi R_p v_g \mu_g \qquad (EQN\ 10)$$

The radial gas velocity ($v_p$) at the perimeter of the disks (again assuming quick gas spin up in between the disks) can be expressed as follows:

$$v_p = M/A_o \rho_g \qquad (EQN\ 11)$$

where
M=the mass flow rate of the gas
$A_o$=the flow area of the disk perimeter

The flow area ($A_o$) is represented as follows:

$$A_o = 2\pi R_o d\# \qquad (EQN\ 12)$$

where
d=intra-disk spacing
=number of disk spaces

Substituting EQN 12 into EQN 11 yields:

$$v_p = M/2\pi R_o d\# \rho_g \qquad (EQN\ 13)$$

Substituting EQN 13 into EQN 10 gives:

$$F_D = 3\mu_g R_p M/R_o d\# \rho_g \qquad (EQN\ 14)$$

As a result, the drag force acting on the particle is:

(a) linearly proportional to the radius of the particle and the mass flow rate, and (b) inversely proportional to the outer radius of the disks, to the intra-disk spacing, and to the number of disk spacings.

Equating the centrifugal force (EQN 8) with the drag force (EQN 14) establishes the particle size cutoff for the filter device as a function of device parameters as follows:

$$\rho_p(4/3\pi R_p^3)\omega^2 R_o = 3\mu_g R_p M/R_o d\#\rho_g \quad \text{(EQN 15)}$$

Rearranging yields:

$$R_p = 3/2R_o\omega[(\mu_g M/d\#\pi\rho_p)]^{1/2} \quad \text{(EQN 16)}$$

Assuming that $\rho_p$ and M are constant or given, EQN 16 indicates that the particle separation cutoff point (particles above $R_p$ will be excluded from the filter device, particles below $R_p$ could pass through the filter device) is:

(a) inversely proportional to the outer radius of the disk and its angular velocity, (b) inversely proportional to the square root of intra-disk spacing, the number of disk spacings in the filter, and the density of the particles, and (c) directly proportional to the square root of the dynamic viscosity of the gas and the mass flow rate of the cause of the flow, (i.e., the cause can be the turbine).

Since the results are based on the assumption that the particle laden gas is rotating at the same velocity as the disks, the use of spacers, preferably "aerodynamic" spacers, between the disks to cause the gas between the disks to be up to speed quickly is important. Without these spacers, the effective $R_o$ of the disks is reduced to where the boundary layers of gas between the disks blend into each other to become one layer (i.e., solid body rotation is achieved) instead of being two distinct layers within the interior of each disk space. Because the forgoing analysis has shown that the separation efficiency is inversely proportional to the "effective" disk outside radius, quick spin up of the gas between the disks is important for accurately selecting design parameters for separation efficiency.

As can be seen from the preceding equations, the design parameters of the filter device of the present invention significantly influence the separation efficiency and pressure drop across the filter device. For a given inlet mass flow rate (for instance, defined by the turbine engine), the particle size eliminated from the filter device can be decreased by either increasing the radii of the disks or their rotational speed. The exclusion of particles having a size above a particular diameter is determined by the filter device parameters. For particles larger than the designed cutoff size, the momentum transferred to the particles through the rotating boundary layers of gas is sufficient for ejection from the primary flow streams of gas between the rotating disks. Any particles below the designed cutoff size could pass through the filter.

The following is an example of the particle size that would be ejected by a filter device having parameters as set forth in Table 1.

TABLE 1

| Test Parameters Used in Sample Calculations | |
|---|---|
| No. of Disks in Disk Set | 25 |
| Disk Spaces (#) | 24 |
| Intra-Disk Spacing (d) | 0.1 inch = 0.254 cm = $2.54 \times 10^{-3}$ m |
| Disk Outside Radius ($R_o$) | 4.5 inches = 11.43 cm = 0.1143 m |
| Disk Inside Radius ($R_i$) | 3.5 inches = 8.89 cm = 0.0889 m |
| Density of the Sand ($\rho_p$) | 2.65 g/cm$^3$ = 2650 kg/m$^3$ |
| Density of the Air ($\rho_G$) @ 1 atm & 20° C. | 0.00234 lbs sec$^2$/ft$^4$ = 1.206 kg/m$^3$ |
| Angular Velocity ($\omega$) | 8000 RPM = 133.3 RPS = 837.6 radians/sec |
| Volumetric Gas Flow Rate (M) | 3 lbm/sec = 1.364 kg/sec = 1.131 m$^3$/sec |
| Dynamic Gas Viscosity ($\mu_g$) @ 1 atm & 20° C. | 0.375 $10^{-6}$ lbf sec/ft$^2$ = $1.7955 \times 10^{-5}$ N sec/m$^2$ = 1.7955 $10^{-5}$ kg/m sec |

From the test conditions of Table 1, for a particle of approximately 6.3 microns diameter (particle cutoff point) attempting to enter the filter device, the outward centrifugal force would balance the inward drag force. Hence, larger particles would be flung away from the filter device entrance, and smaller particles could enter the plenum of the filter device.

The net motion of a particle depends on the difference between these two counteracting forces (i.e., the outward centrifugal force and the inward drag force). Since the velocity of the gas at the filter device inlet (calculated by EQN 13) is only 25.8 m/sec, the Reynold's Number for the test parameters used in Table 1 is approximately 2.7. Thus, the particle movement within the gas flow through the filter device would be considered to be very slow or creeping. For particles larger than the particle cutoff point, the centrifugal inertia imparted to the particle attempting to go through the rotating boundary layers of gas of the rotating filter device dominates, and the particle is expelled from the filter device. For particles smaller than the particle cutoff point, the drag force on the particle dominates, allowing the particle to be slowly drawn into the filter device along with the gas.

On the other hand, those particles with a size exactly at the cutoff point would continue "to orbit" the perimeter of the filter device until an external force (such as ram air movement past the flight of the aircraft) caused their removal. For example, during the use of the inventive filter devices on helicopters during hovering operations, a "mini-cloud" of these particles is expected to surround the inlet of the filter device, suspended at the outer edge perimeter of the disks of the filter device, and eventually be discharged when the helicopter resumes forward motion. These suspended particles cannot hurt the performance of the turbine engine since they cannot enter the filter device.

The foregoing equations predict that, for reasonable filter parameters and operating conditions, it is feasible to separate particulates easily from an incoming fluid stream, for instance the incoming gas stream to a turbine engine inlet.

The following pressure drop calculations provide additional pertinent analysis of the operational characteristics of the radial inflow centrifugal filter device of the present invention.

The appropriate total pressure drop $(\Delta P)_T$ across the filter device (from inlet to outlet) is important particularly for use of the inventive filter device with a turbine engine. Minimization of $\Delta P_T$ is desired for the turbine engine to have maximum performance as each 1% loss in pressure across the filter device incurs an approximate 2% loss in turbine power. The total pressure drop can be approximated by a summation of contributing factors as follows:

(a) $\Delta P_a$ associated with a decreasing flow area, (b) $\Delta P_b$ associated with the centrifugal force acting on the rotating gas, and (c) $\Delta P_c$ associated with the frictional drag of the gas between the disks.

Thus, the total pressure drop $(\Delta P)_T$ across the device can be estimated by the contribution of (a)+(b)+(c).

(a) According to Bernoulli's Law, (EQN 17): $\Delta P_a = (1/2\, \rho_g v_g^2)_o - (1/2\, \rho_g v_g^2)_i$ $= 1/2\, \rho_g (v_{go}^2 - v_{gi}^2)$ Substituting from EQN 13, (EQN 18): $\Delta P_a = 1/2\, \rho_g [(M/2\pi R_o d\#)^2 - (M/2\pi R_i d\#)^2]$ $= 1/2\, \rho_g (M/2\pi d\#)^2 (1/R_o^2 - 1/R_i^2)$ where $_o$ =at outside radius $_i$ =at inside radius i.e., the pressure drop for flow from the outside radius of the disks to the inside radius is inversely proportional to the differences between their respective flow areas.

(b) From the centrifugal force term, obtained is:

$\Delta P_b = (1/2\, \rho_g v_g^2)_o - (1/2\, \rho_g v_g^2)_i$ (EQN 19)

If $v_g = \omega R$, then substituting:

(EQN 20): $\Delta P = 1/2\, \rho_g \omega^2 R_o^2 - 1/2\, \rho_g \omega^2 R_i^2$ $= 1/2\, \rho_g \omega^2 (R_o^2 - R_i^2)$ (c) The pressure drop due to the frictional drag (D) of the boundary layer(s) can be expressed as:

$\Delta P_c = D/A = 1/2 C_f \rho_g v_o^2 / A$ (EQN 21)

However, the coefficient of friction (due to the surface roughness of the disks) is meaningful only with turbulent flow, not with laminar flow. In almost all of the foreseeable cases using the inventive filter device, the extremely low Reynold's Numbers are indicative of creeping laminar flow; therefore, this term drops out of the pressure drop calculation.

Consequently, the total pressure drop $(\Delta P)_T$ across the filter device can be expressed as a summation of EQNs 18, 20 and 21. If EQN 21 is negligible for the above case, then:

$\Delta P_T = 1/2 \rho_g [(M/2\pi d\#)^2(1/R_o^2 - 1/R_i^2)] + 1/2 \rho_g \omega^2(R_o^2 - R_i^2)$ (EQN 22)

Rearranging yields:

$\Delta P_T = 1/2 \rho_g [(M/2\pi d\#)^2 (1/R_o^2 - 1/R_i^2) + \omega^2 (R_o^2 - R_i^2)]$ (EQN 23)

As can be seen, minimizing the total pressure drop across the filter device is desirable for a specified particle size rejection. To summarize, the above equations show that the filter device will have a minimal total pressure drop for a given mass flow rate if (a) the inside radius of the disks is as large as possible to establish the required boundary layer thicknesses and if (b) the disk rotational speed is reduced. The first filter device parameter (inner disk radius) is the preferred controlling factor since this parameter does not directly adversely affect the particle size rejection when decreased. Optimizing total pressure drop solely on the disk rotational speed (decreased angular velocity) would cause an increase in the minimum size of particle that would be rejected.

If the test conditions of Table 1 are used, the drop in total pressure across the filter device can be approximated by solving EQN 23. Substituting appropriate values shows that there will be a 2.1% total pressure drop across the filter device using the above geometric and operational test parameters.

If other test conditions are implemented, a trade-off between separation efficiency (i.e., higher particle cutoff point allowable) and total pressure drop across the filter device can be ascertained. For example, if the test conditions of Table 1 exist, except that the angular velocity is decreased to 6000 RPM, then the particle cutoff point is increased to 8.4 microns in diameter, but the total pressure drop across the filter device drops to 1.2%. Furthermore, if the test conditions of Table 1 exist, except that the angular velocity is decreased further to only 4000 RPM, then the particle cutoff point is increased to 12.5 microns in diameter, but the total pressure drop across the filter device drops even more to only 0.45%. Preferably, with the present invention, the total pressure drop should be no greater than 3%.

Clearly, the filter device of the present invention can be tailored to specific environmental conditions as warranted during normal flight operations simply by changing one filter device parameter. Of course, other filter device parameters and/or combinations can be changed to optimize the specific output desired. Current state-of-the-art inlet particle separators have efficiencies for this size particulate in the low to mid 80% range. In contrast, separation efficiencies in the very high 90% range can be achieved with the present invention, whereby maintenance downtime should be significantly reduced.

The present invention has major potential commercial applications, for instance, for use in bag houses, cyclones, industrial blowers, military and civilian helicopters, military vehicles (tanks, turbine powered transports, etc.), hovercraft, and auxiliary power units (both land-based and in the air). Moreover, a high temperature filter device unit could be constructed of appropriate ceramics/composites for use in cleaning the combustion gases (i.e., fly ash) originating from coal-fired burners used to power large land-based turbine generators, eliminating a multiplicity of gas filtration steps currently used, particularly an expensive non-self-cleaning ceramic crossflow filter immediately preceding the entrance to the turbine generator. Additionally, the filter device of the invention can be used to separate solids that are suspended or dispersed in a liquid, i.e., solid biological materials from a biofluid, such as blood cells from blood plasma or cell culture growth from suspending media.

The novel radial-flow centrifugal filter device is inherently self-cleaning, thus requiring little if any maintenance. Moreover, it is mechanically simpler, having a minimum of low-cost parts, than current inlet particle separator designs. Furthermore, this simplicity in design results in a lower overall weight of the device, resulting in a desirable enhanced overall thrust-to-weight ratio of the turbine engine. Also, the filter device can be retrofitted to existing turbine engines already in the field, as well as integrated into future turbines.

Additionally, the novel radial-flow centrifugal filter can be used at high temperatures for pre-cleaning of hot combustion gases introduced to a turbine generator used for making electricity, without requiring the use of intermediary cyclones and a final barrier-type filter that is not self-cleaning as is typical in the prior art. Furthermore, judicious choice of refractory materials/composites for the rotating disks will allow the use of the highest gas temperatures that can be generated by combustion processes without the use of make-up air to dilute the gas temperature prior to introduction to the turbine for the purpose of enhancing the longevity of the filter device as is typical in prior art, thus significantly increasing the Carnot efficiency of the turbine, resulting in higher electrical output of the generator for the same fuel consumption, thereby having significantly lower cost in the generation of electricity.

Also, the filter device of the present invention, as compared to prior art inlet particle separators, has mechanical simplicity of design, allowing for ease of initial fabrication, reduced overall cost (at a higher performance level), easy maintenance when required, and non-complicated filter device modeling for accurate prediction of operational constraints within design parameter considerations. The disks do not have to be very stiff since they operate under centrifugal tension. Since the temperatures that are typically experienced in the device under normal operations are moderate, inexpensive aluminum alloys or possibly even some types of reinforced plastics could be used.

It will be understood that various details of the invention may be changed without departing from the scope of the invention. Furthermore, the foregoing description is for the purpose of illustration only, and not for the purpose of limitation--the invention being defined by the claims.

What is claimed is:

1. A radial inflow centrifugal filter device for separating particulates from a flow of fluid, comprising:

(a) a rotatable plurality of disks having an inlet end and an exit end, and each disk having a hollow center and a perimeter and two sides, the centers defining an interior hollow plenum that is continuous and of uniform diameter, and the disks being mounted to spacers in spaced apart parallel relationship defining spaces between the disks and wherein the hollow plenum communicates with the spaces between the disks;

(b) an end cap attached at the disk inlet end; and (c) a hollow rotatable tube attached at the exit end and in communication with the hollow plenum of the disks to provide, during operation of said filter device, clean filtered fluid passage via a lower pressure existing in the hollow plenum than in the spaces between the disks due to the communication through the hollow tube to the hollow plenum of the disks such that rotating the hollow tube and the disks while a flow of particulate laden fluid is introduced to the inlet end of the disks from outside the disks produces a sufficient boundary layer of fluid on each of the two sides of each disk wherein the boundary layer of fluid on the side of a disk touches or overlaps with the adjacent boundary layer of fluid on the side of the adjacent disk, and the boundary layers of fluid impart angular momentum to particulates entrapped in the fluid flow, thereby preventing their entering the spaces between the disks, so that clean filtered fluid passes through the plenum and out the exit end and the particulates are ejected and pass outside the perimeters of the disks.

2. The radial inflow centrifugal filter device according to claim 1, wherein the fluid is liquid.

3. The radial inflow centrifugal filter device according to claim 2, wherein the liquid is a biofluid and the particulates are cells.

4. The radial inflow centrifugal filter device according to claim 1, wherein the fluid is gas.

5. The radial inflow centrifugal filter device according to claim 4, wherein the gas is air.

6. The radial inflow centrifugal filter device according to claim 1, wherein the filter device is useful to separate particulates from a hot gas stream of a coal-fired turbine generator, and the disks and other components of the filter device are made of a suitable high-temperature corrosion-resistant refractory material selected from the group consisting of metal, ceramic, composite, intermetallic, and combinations thereof.

7. The radial inflow centrifugal filter device according to claim 1, wherein the spaces between parallel disks can be varied during operation of the filter device.

8. The radial inflow centrifugal filter device according to claim 1, wherein the filter device is housed in a protective housing in communication with the flow of fluid and defining a cavity between the filter device and the housing such that the flow of fluid through the cavity surrounding the filter device allows for scavenging of particulate build up around the perimeter of the inlet end to the filter device without use of an auxiliary blower.

9. The radial inflow centrifugal filter device according to claim 1, wherein rotating the disks via the hollow tube is accomplished with a gas impeller that utilizes excess compressed gas from a compressor of a turbine engine to rotate mechanically the tube.

10. The radial inflow centrifugal filter device according to claim 1, wherein rotating the disks and the hollow tube is accomplished with an auxiliary mechanical power take off shaft driven by a turbine engine.

11. The radial inflow centrifugal filter device according to claim 1, wherein rotating the disks and the hollow tube is accomplished with an integral concentric power shaft directly connected to a main turbine engine rotating shaft.

12. The radial inflow centrifugal filter device according to claim 1, wherein rotating the disks and the hollow tube is accomplished with a motor.

13. The radial inflow centrifugal filter device according to claim 1, wherein rotating the disks and the hollow tube is variable, such that changing the selected size of particulates that are to be ejected and changing the pressure drop across the filter device are facilitated.

14. The radial inflow centrifugal filter device according to claim 1, wherein a rotatable hollow cone-shaped end cap is attached at the inlet end of the filter device, the cone-shaped end cap having a perimeter extending beyond the perimeters of the disks of the filter device, such that foreign objects impacting the cone-shaped end cap during rotation of the disks are deflected away from the inlet of the filter device.

15. The radial inflow centrifugal filter device according to claim 14, wherein hot excess bleed air from a turbine compressor is introduced into the hollow cone-shaped end cap and allowed to exit from the cone-shaped end cap into the central plenum of the filter device, allowing for de-icing of the filter device during inclement freezing weather.

16. The radial inflow centrifugal filter device according to claim 1, wherein the ejected particulates have a diameter size of about 6 microns or greater.

17. The radial inflow centrifugal filter device according to claim 1, wherein the ejected particulates have a diameter size of about 0.01 microns or greater.

* * * * *